Nov. 5, 1929.                A. G. BORCHERT                1,734,710
                METHOD OF MANUFACTURING SCREEN FRAMES
                          Filed Jan. 29, 1927

Inventor
Albert G. Borchert
By Bates, Macklin, Golrick & Teare
Attorneys

Patented Nov. 5, 1929

1,734,710

UNITED STATES PATENT OFFICE

ALBERT G. BORCHERT, OF CLEVELAND, OHIO

METHOD OF MANUFACTURING SCREEN FRAMES

Application filed January 29, 1927. Serial No. 164,400.

This invention relates to metallic screens which are adapted for windows, doors and the like, and has for one of its objects an efficient method of manufacturing an integral metallic screen frame, which embodies a single unitary structure. Heretofore, the metallic frame members have usually been made of sheet metal strips bent to the desired form, and then joined along a longitudinal seam by a welding or soldering operation. This type of construction does not possess sufficient rigidity to produce a satisfactory screen frame, especially one having an unusual length or width. Moreover, in time the longitudinal seams are apt to open and thereby to cause a loosening of the screen from the frame. Still another objection, however, to the use of welded or soldered sheet metal strips is the susceptibility of the frame to distortion while the screen is being stretched onto the frame.

One method of eliminating the necessity for a welded seam which extends longitudinally of each rail is set forth in Letters Patent of the United States No. 1,596,507 issued August 17, 1926 to A. L. Otto. Briefly, the method of forming a rail illustrated in the Otto patent is to extrude metal in a plastic state from a die, and to so form the die that the extruded rail has the desired channel extending in a longitudinal direction. One objection to the extruding of metal through a die, however, is the tendency for the extruded metal to warp during the cooling operation. Obviously, any warping of the rail prevents accurate alignment of the finished frame, and increases the difficulty of holding the screen in place by means of a securing member which is adapted to be placed in the usual rail channel.

I overcome the difficulties which are inherent in a rail having a longitudinally extending seam, and also the objections inherent in the extrusion of metal, by forming each rail from a hollow sheet metal article, preferably a tube. I then join the ends of the rails with a reinforcing member in the usual way. If a tube is used as a starting body, then it may be progressively deformed through suitable rolls in an expeditious manner. In this way I obtain a rail which has great rigidity and freedom from distortion.

Figure 1:
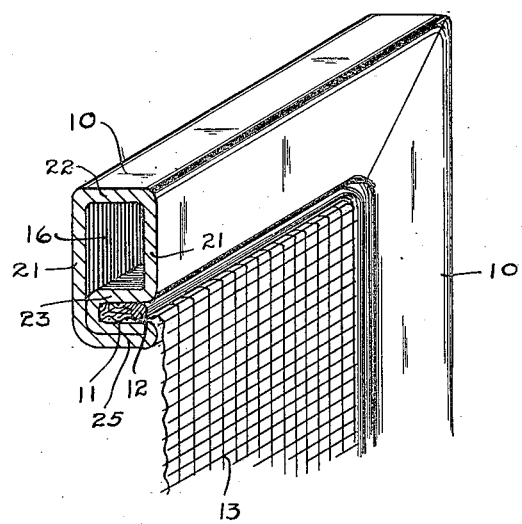
Figure 2:
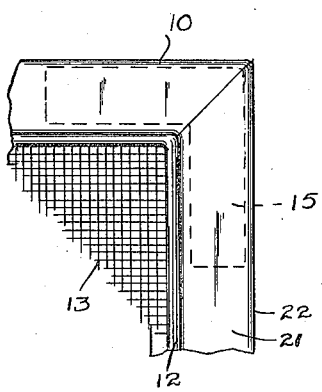
Figure 3:
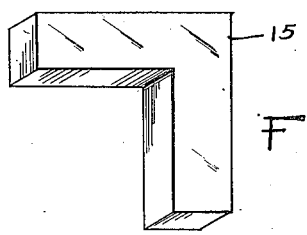
Figure 4:
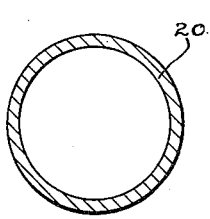
Figure 5:
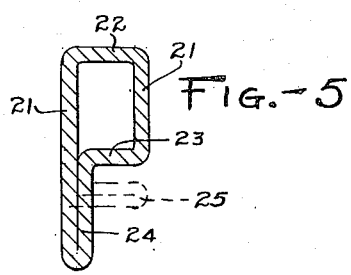

Referring now to the drawings, Fig. 1 shows a perspective view of a part of a screen made by my invention; Fig. 2 is an elevation showing one corner construction of the screen; Fig. 3 is a perspective view showing a corner reinforcing member; Figs. 4 and 5 are transverse sections through a sheet metal member which forms the rail, and illustrate different steps in the formation of the finished product.

In Figs. 1 and 2, 10 designates a rail or stile of a metallic screen which is made in accordance with my invention. The frame embodies inter-connected one-piece hollow sheet metal members, each of which is formed with a channel 11. This channel extends longitudinally of each member and provides a recess into which a screen-locking member 12 may be forced for holding the wire fabric 13 in place, in the usual way.

The frame members as illustrated are connected by a mitered joint and such joints are reinforced in any suitable way. One form of such reinforcement is illustrated in Fig. 3 as embodying an L-shaped member 15. Each arm of the member 15 is arranged to extend into the passageway 16 which is formed in the body portion of each frame member. By making the connection between the reinforcing and frame members a close or snug fit, then the mitered connections can be securely held together without necessitating the use of much solder.

To make the hollow one-piece frame members, I deform a hollow integral body such as a tube 20, by passing it progressively through a set of rolls or through forming dies to change the cross-sectional shape from that shown in Fig. 4 to that illustrated in Fig. 1. One of the steps in the forming operation is shown in Fig. 5 by the full lines wherein the body portion of the frame member is formed with flat sides 21 and correspondingly flat top and bottom portions 22 and 23, respectively. This figure also illustrates part of the metal as being folded upon itself as at 24. In a subsequent operation, the portion 24 is bent upwardly and substantially parallel to the bottom as indicated by the broken lines 25. In this way, I form a channel which, as is illustrated in Fig. 1, extends longitudinally of the frame member, and has sufficient depth to receive the bend of the fabric, and also has sufficient flexibility to hold the screen-locking member 12 in proper position. In practice I may form the shape illustrated in Fig. 5 from the body which normally would be made into a circular tube. This would eliminate the necessity for making a finished tube and then deforming it to make the rail.

The important advantage of my invention is the fact that the rail or stile, and therefore, the hollow metallic frame, has great rigidity, and can be made in an expeditious manner from standard metallic tubing. In this way I eliminate the necessity for making a soldered or welded seam which extends longitudinally of each frame member. Moreover, I can vary the strength of the frame to suit any particular condition merely by varying the gage of the metal from which the tube is made.

I claim:

The method of forming a rail for a screen frame from a metallic tube including the steps of deforming the tube to make a hollow rectangular body portion with a laterally extending portion, and then bending the laterally extending portion toward the rectangular body portion so as to form an outwardly opening channel extending longitudinally of the rail.

In testimony whereof, I hereunto affix my signature.

ALBERT G. BORCHERT.